(12) United States Patent
Kusayama et al.

(10) Patent No.: US 7,416,397 B2
(45) Date of Patent: Aug. 26, 2008

(54) WATERPROOF SLIDE FASTENER AND APPARATUS FOR MANUFACTURING THE SAME

(75) Inventors: Masahiro Kusayama, Toyama-ken (JP); Kenji Yuki, Toyama-ken (JP); Ryo Tanaka, Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 11/709,553

(22) Filed: Feb. 22, 2007

(65) Prior Publication Data

US 2007/0169320 A1    Jul. 26, 2007

Related U.S. Application Data

(62) Division of application No. 11/062,356, filed on Feb. 22, 2005, now Pat. No. 7,337,506.

(30) Foreign Application Priority Data

Feb. 25, 2004    (JP) ............................... 2004-50248

(51) Int. Cl.
| | |
|---|---|
| *B21C 3/00* | (2006.01) |
| *B21C 3/02* | (2006.01) |
| *A44B 19/00* | (2006.01) |
| *A44B 19/02* | (2006.01) |
| *A44B 19/10* | (2006.01) |
| *A44B 19/32* | (2006.01) |

(52) U.S. Cl. .................. 425/116; 425/110; 425/117; 425/814; 425/542; 425/545; 425/572; 24/381; 24/389

(58) Field of Classification Search ............... 425/814, 425/110, 116, 117, 542, 545, 572, 121; 24/1, 24/381, 389

See application file for complete search history.

(56) References Cited

U.S. PATENT DOCUMENTS

| | | | | |
|---|---|---|---|---|
| 2,397,331 A | * | 3/1946 | Winterhalter | ................ 24/408 |
| 4,330,244 A | * | 5/1982 | Heimberger | ................ 425/115 |
| 4,350,656 A | * | 9/1982 | Moertel | ...................... 264/166 |

FOREIGN PATENT DOCUMENTS

| | | |
|---|---|---|
| EP | 0108214 | 5/1984 |
| EP | 1388302 | 2/2004 |
| GB | 2175637 | 12/1986 |
| JP | 59-41107 U | 3/1984 |
| JP | 63-30247 U | 8/1988 |
| WO | WO 02/03825 | 1/2002 |

* cited by examiner

*Primary Examiner*—Dah-Wei Yuan
*Assistant Examiner*—Magali P Theodore
(74) *Attorney, Agent, or Firm*—Alston & Bird LLP

(57) ABSTRACT

A waterproof slide fastener and a manufacturing apparatus thereof are disclosed, wherein each fastener element has a coupling head, a neck portion, a body portion, and leg portions which are continuously fused and integrated, a terminal end is projected from a gap between upper/lower half portions of the coupling head, upper/lower flanges of a slider make a sliding contact with a surface of each of upper/lower half portions of each leg portion, each half portion of the leg portion extending from the body portion via a crotch portion and guiding the flanges, two or more leg portions are disposed with a predetermined interval in a sliding direction, an entire shoulder width of a shoulder portion is larger than a body width of the body portion if it is provided, thereby intensifying fixing strength between a fastener tape and fastener elements and waterproofness, and allowing a smooth sliding of a slider.

4 Claims, 15 Drawing Sheets

US 7,416,397 B2

WATERPROOF SLIDE FASTENER AND APPARATUS FOR MANUFACTURING THE SAME

CROSS REFERENCE TO RELATED APPLICATION

This is a divisional of application Ser. No. 11/062,356 filed Feb. 22, 2005, now U.S. Pat. 7,337,506 incorporated herein by reference.

BACKGROUND OF THE INVENTION

1. Field of the Invention

The present invention relates to a waterproof slide fastener in which a plurality of synthetic resin made fastener elements are formed by injection molding on both front and rear faces of one edge portion of a waterproof fastener tape including a waterproof layer made of elastomer resin on a belt-like core material formed by weaving or knitting, and an apparatus for manufacturing the same.

2. Description of Related Art

This kind of slide fastener has a waterproofing structure in which with the fastener tape woven or knitted with fibers as a belt-like core material, both front and rear faces of the core material are covered with an elastomer material such as natural rubber or synthetic rubber, and fastener elements of synthetic resin are formed integrally by injection molding along one side edge of this fastener tape such that each of them strides over the front and rear faces. Usually, an element mounting edge portion of the fastener tape includes through holes which are formed at a forming portion of each fastener element, the through holes acting as a passage route of molding resin for each fastener element and connecting integrally upper and lower half portions of the fastener elements formed on the front and rear faces of the fastener tape.

Because in this kind of conventional slide fastener, however, as disclosed in for example, Japanese Utility Model Application Laid-Open NO. 59-41107, upper and lower half portions of fastener elements are formed on front and rear faces of a fastener tape through through holes formed in an element mounting edge portion of the fastener tape. Accordingly, when this fastener tape is attached to a suit for underwater construction or wet suit, water can ooze out from a front side to a rear side of a slide fastener through a boundary face between the fastener tape and the fastener elements and the through holes at a place where there is a large difference in pressure between the front side and rear side of the slide fastener.

Thus, according to, for example, International Application Publication No. WO 02/03825 A1, front and rear faces of a fastener tape are covered with thermoplastic synthetic resin likely to be chemically fused with fastener elements, such as polypropylene, polycarbonate, polyethylene terephthalate, polybutylene, vinyl chloride, polyamide or high density polystyrene, whereby improving an adhesion of boundary between the fastener tape around the through hole and the fastener elements, aiming at holding water tightness at the boundary. Further, according to the International Application Publication No. WO 02/03825 A1, an end portion on opposite side to a coupling head of the fastener element is formed into an inclined face which is inclined downward toward a tape surface and then, upper and lower flange portions formed to oppose upper and lower blade pieces of a slider which engages and disengages element rows when a sliding operation is performed, are inclined such that the upper and lower flanges approach at a same angle as the aforementioned inclined face, so that the sliding operation of the slider can be carried out smoothly.

Furthermore, according to, for example, Japanese Utility Model Application Publication No. 63-30247, the front face and the rear face of a fastener element are connected to each other by a connecting portion which runs through a through hole formed in an element mounting edge portion of the fastener tape so as to intensify a connection strength between the fastener tape and the fastener element. At the same time, adhesive agent layers are formed on both the front and rear faces corresponding to at least near the through hole in the fastener tape, boundary between the fastener tape and the fastener element around the through hole is sealed with these adhesive agent layers aiming at holding water tightness at the boundary.

Any structure disclosed in the aforementioned publications comprises upper and lower half portions molded symmetrically and disposed on front and rear sides such that the element mounting edge portion of the fastener tape is nipped, and includes: a coupling head which has a gap allowing it to nip an exposed end of the fastener tape and extend outward from the mounting edge of the fastener tape; a neck portion and a body portion which nip and are integrated together on the element mounting edge portion of the fastener tape; and thin right and left shoulder portions which nip and are integrated on the element mounting edge portion of the fastener tape and extend in right and left directions from the neck portion. Further, according to the Japanese Utility Model Application Laid-Open NO. 59-41107 and Japanese Utility Model Application Publication No. 63-30247, a ladder-like fin piece, which narrows gradually toward its tip, extends from an end portion on an opposite side to the neck portion of the body portion such that the fin pieces nip and are integrated on both the front and rear faces of the element mounting edge portion. This ladder-like fin piece is disposed at a position opposing the flanges of the slider so as to guide the sliding of the slider through its outer surface not to make a sliding contact with the fastener tape.

In the slide fastener disclosed in the International Application Publication No. WO 02/03825 A1, a sliding contact area of the slider to the fastener element is large. Even if a component of force applied obliquely downward to the fastener element decreases when the slider is slid, in case of an ordinary slider, this only can meet an increase in sliding resistance accompanied by an increase in the sliding area and thus, there is no guarantee that a smooth sliding operation is secured. Further, the fastener element of this Publication does not include any portion for guiding the sliding of upper and lower opposing faces of right and left flange portions formed on upper and lower blade pieces of the slider. Therefore, the upper and lower opposing faces of the flanges may make a sliding contact with the fastener tape, so that the synthetic resin layers on the front and rear faces of the fastener tape may be flawed by rubbing, thereby possibly leading to reduction in waterproof performance.

On the other hand, in the fastener elements disclosed in the aforementioned Japanese Utility Model Application Laid-Open NO. 59-41107 and Japanese Utility Model Application Publication No. 63-30247, a fin piece is disposed on each side of the front and rear faces at an end portion on an opposite side to the coupling head, the fin piece having a guide surface for guiding the sliding of upper and lower flange end faces of the slider through its surface. Thus, there is no fear that the surface of the fastener tape may be flawed by rubbing unlike the International Application Publication No. WO 02/03825 A1. However, the sliding resistance can not be reduced so much because its sliding area is large. In addition, a body portion molding cavity and a fin piece molding cavity are continuous and areas of them are large when molding the fastener elements. Therefore, pressing force on the fastener tape due to the upper and lower half portions of the body portions and fin pieces formed with the same cavities are likely to disperse, so that a fixing force of the fastener element to the fastener tape likely drops.

SUMMARY OF THE INVENTION

The present invention has been achieved to solve conventional problems about this kind of waterproof slide fastener, and an object of the invention is to provide a waterproof slide fastener capable of intensifying fixing strength and waterproof performance between a fastener tape and a fastener element and allowing a smooth sliding operation of a slider, and a manufacturing apparatus capable of continuously manufacturing the waterproof slide fastener easily and effectively.

According to an aspect of the present invention, such an object is achieved by a waterproof slide fastener comprising a pair of fastener stringers having a plurality of fastener elements aligned along each of opposing element mounting edge portions of a pair of waterproof fastener tapes including a waterproof layer made of elastomer resin or the like on a belt-like core material obtained by weaving or knitting and a slider for engaging and disengaging the fastener elements, wherein each fastener element is made of a synthetic resin material and comprises a coupling head, a neck portion, a body portion, and leg portions extending from the body portion inward of each of the fastener tape; the coupling head, the neck portion, the body portion and the leg portions are composed of upper and lower half portions formed integrally on front and rear faces of the fastener tape, the upper and lower half portions being integrated with each other by a connecting portion through a through hole formed in the fastener element mounting edge portion; a terminal end of the element mounting edge portion extends beyond the neck portion such that end faces of the opposing fastener tapes come into a pressure contact with each other when the fastener elements are engaged, and there is formed a gap between the upper and lower half portions of the coupling head; each half portion of the coupling head and the leg portions is formed thinner than each half portion of the neck portion and the body portion in a direction perpendicular to a plane in which the fastener tape lies; a gap between opposing faces of upper and lower flanges of the slider has a dimension for making a slide contact with each of the upper and lower half portions of the leg portions; and the upper and lower half portions of the leg portions guide sliding of the upper and lower flanges of the slider and are composed of two or more units disposed with a predetermined gap in a sliding direction of the slider. Preferably, the waterproof slide fastener of the present invention further comprises shoulder portions extending in right and left directions from the neck portion to the body portion in a wing-like shape.

According to another aspect of the present invention, there is provided a waterproof slide fastener comprising: a pair of fastener stringers having a plurality of fastener elements aligned along each of opposing element mounting edge portions of a pair of waterproof fastener tapes including a waterproof layer made of elastomer resin or the like on a belt-like core material obtained by weaving or knitting; and a slider for engaging and disengaging the fastener elements, wherein each fastener element is formed of a synthetic resin material and comprises a coupling head, a neck portion, a body portion and right and left shoulder portions extending from the neck portion to the body portion and expanding in right and left directions in a wing-like shape; the coupling head, the neck portion, the body portion and the shoulder portions are composed of upper and lower half portions formed integrally on front and rear faces of the fastener tape, each of the upper and lower half portions being integrated with each other by a connecting portion through a through hole formed in the element mounting edge portion; a terminal end of the element mounting edge portion extends beyond the neck portion such that the end faces of the opposing fastener tapes come into a pressure contact with each other when fastener element rows are engaged, and there is formed a gap between the upper and lower half portions of the coupling head; each half portion of the coupling head and shoulder portions is formed thinner than each half portion of the neck portion and body portion in a direction perpendicular to a plane in which the fastener tape lies; and an entire shoulder width of the right and left shoulder portions including the neck portion is set larger than a body width of the body portion.

Preferably, each of the upper and lower half portions of the right and left shoulder portions partially contain a cutout portion. Preferably, warp yarns having a higher shrinkability than other warp yarns are disposed at terminal ends of the belt-like core materials wherein the terminal ends are opposed to each other. Further preferably, each half portion of the coupling head has a half portion of a protrusion located between the shoulder portions adjacent in a length direction of the fastener tape when opposing fastener elements engage each other, the half portion of the protrusion being disposed on part of a surface of the coupling head on a fastener tape side.

The waterproof slide fastener having the above-described structure can be manufactured easily and effectively with a manufacturing apparatus having following basic components of the present invention. That is, the manufacturing apparatus comprises a first mold which is movable in opening and closing directions of a mold assembly, a second mold which is fixed and a third mold which is located between the first mold and the second mold, wherein the first and second molds have an insertion passage for a fastener tape having a through hole at a formation position of fastener elements and the first mold includes a sprue, a runner, a gate, and the first and second molds have first and second cavities for molding upper and lower half portions of each fastener element along each side edge portion of front and rear faces of the fastener tape; the first and second cavities have half portion molding cavities for a coupling head, a neck portion, a body portion, right and left shoulder portions and the leg portions, and the third mold is disposed between the half portion molding cavities for the coupling head in the first and second molds and has a gap for nipping a part of a terminal end of the side edge portion of the fastener tape at an end portion thereof; each half portion molding cavity for the right and left shoulder portions and the leg portions has a thinner molding space than that of each half portion molding cavity for the neck portion and the body portion to be formed integrally on the side edge portion of the fastener tape with half portions of the neck portion and the body portion; and each half portion molding cavity for each of the leg portions is composed of two or more cavities formed with a predetermined interval in a length direction of the fastener tape.

Preferably, in each half portion molding cavity for the shoulder portions, a maximum length between right and left end portions thereof is set larger than a length between right and left end portions of the half portion molding cavity of the body portion. Preferably, each half portion molding cavity for the shoulder portions partially has a blocking portion. Further, preferably, the third mold nips the terminal end of the fastener tape which is exposed when opposing fastener element rows are engaged with each other, and has a protrusion molding cavity for molding a protrusion located between the shoulder portions adjacent in the length direction of the fastener tape.

A feature structure of the slide fastener having a waterproof performance of the present invention exists in that two or more leg portions are provided instead of a single fin piece formed on a conventional waterproof slide fastener. By providing two or more leg portions, sliding faces for guiding the flange portions of the slider are necessarily reduced so that a sliding resistance at the time when the slider is slid is decreased, thereby making a sliding operation smooth. Further, a point on which attention should be paid is that not only the sliding resistance is just reduced but also a fixing strength of the fastener elements to the fastener tape is intensified.

That is, because the two or more leg portions are extended from the body portion individually and separately through a crotch portion, the fastener tape is pressed through both front and rear faces by mold faces between the half portion molding cavities disposed separately for the two or more leg portions. Consequently, no deflection occurs in the fastener tape at the time of formation, so that each leg portion is fused firmly with both the front and rear faces of the fastener tape.

A feature point of a basic structure of the present invention exists in the fastener elements like the above-described feature, and particularly such a point that it has shoulder portions extended in the right and left directions from the neck portion to the body portion and that the entire shoulder width connecting outer ends of the right and left shoulder portions is set larger than the width of the body portion. If the entire shoulder width between the outer ends of the right and left shoulder portions including the body portion is set larger than the width of the body portion in this way, a force for the terminal end of the fastener tape to come into a pressure contact with each other is intensified so that they can come into the pressure contact securely, thereby intensifying the waterproof performance. At this time, if the right and left shoulder portions are divided into two sections or a through hole is formed therein, the upper and lower half portions of the shoulder portions are joined together through a connecting portion like the leg portion and the fixing strength of the shoulder portion to the fastener tape is increased.

According to a preferred embodiment, if warp yarns having a higher shrinkability than other warp yarns are disposed on opposing side terminal end of the fastener tape, the terminal end on an element mounting edge portion side is shrunk more than other region due to formation heat. Therefore, the terminal end of the element mounting edge portion side is dented inward slightly and curved to sufficiently withstand a lateral pulling force which tends to release engagement of opposing fastener elements, and consequently the engagement is never released easily. If, in each half portion of the coupling head formed on the front and rear faces of the fastener tape, each half portion of a protrusion, which makes contact with a side face of each shoulder portion of an adjoining fastener element in a direction of a tape length when the opposing fastener element rows are engaged, is formed in part of a surface of a fastener tape side of the coupling head, an inner face of the half portion of the coupling head makes a firm contact with a surface of the half portion of each shoulder portion when the fastener elements are engaged, and part of side faces of protrusions make a firm contact with each other. Accordingly, the waterproof performance is increased and at the same time, the engagement. configuration is stabilized.

According to the apparatus for manufacturing a waterproof slide fastener of the present invention, by forming the half portion molding cavities for two or more leg portions with a predetermined gap in the length direction of the fastener tape, the fastener tape is nipped through its front and rear faces with a strong nipping force by a mold portion between the half portion molding cavities for the two or more leg portions. Consequently, when molten resin flows in a single direction from the front face to the rear face through the through hole formed in the element mounting edge portion of the fastener tape from a gate, no deflection occurs in the element mounting edge portion, so that the elements are formed on both the front and rear faces of the fastener tape uniformly in a stable condition.

If, in the manufacturing apparatus of the present invention, the maximum length between the right and left end portions in each half portion molding cavity of the shoulder portion is set larger than the length of the body portion molding cavity between its right and left end portions, the inner face of the half portion of the coupling head makes contact with the surface of the half portion of each shoulder portion in a large range when the fastener elements are engaged as described above and consequently, the waterproof performance is intensified and the engagement configuration is stabilized. In this case, if the blocking portion is formed in part of each half portion molding cavity for the shoulder portion, the terminal end of the element mounting edge portion of the fastener tape is nipped through its front and rear faces by the blocking portions. As a result, the configuration of the terminal end is stabilized so that the fixing strength of the fastener element at the terminal end is secured.

At this time, if a tape end nipping portion is formed at an end of the third mold, an exposed terminal end of the fastener tape is nipped by the tape end nipping portions and thus, the neck portion, the shoulder portion and the body portion are fixed to the fastener tape strongly. If the protrusion molding cavity for molding the protrusion, which makes contact with each of right and left side faces of the shoulder portion adjoining in the direction of the tape length, is formed in this third mold, the aforementioned protrusion can be created. Further, if the third mold is constituted of two pieces for a first mold side and a second mold side, a processing accuracy of the tape end nipping portion is improved because it is divided into two sections and further, the element mounting edge portion of the fastener tape can be nipped firmly.

DESCRIPTION OF THE PREFERRED EMBODIMENTS

Preferred embodiments of the present invention will be described below with reference to typical examples shown in the figures.

First Embodiment

Figure 1:
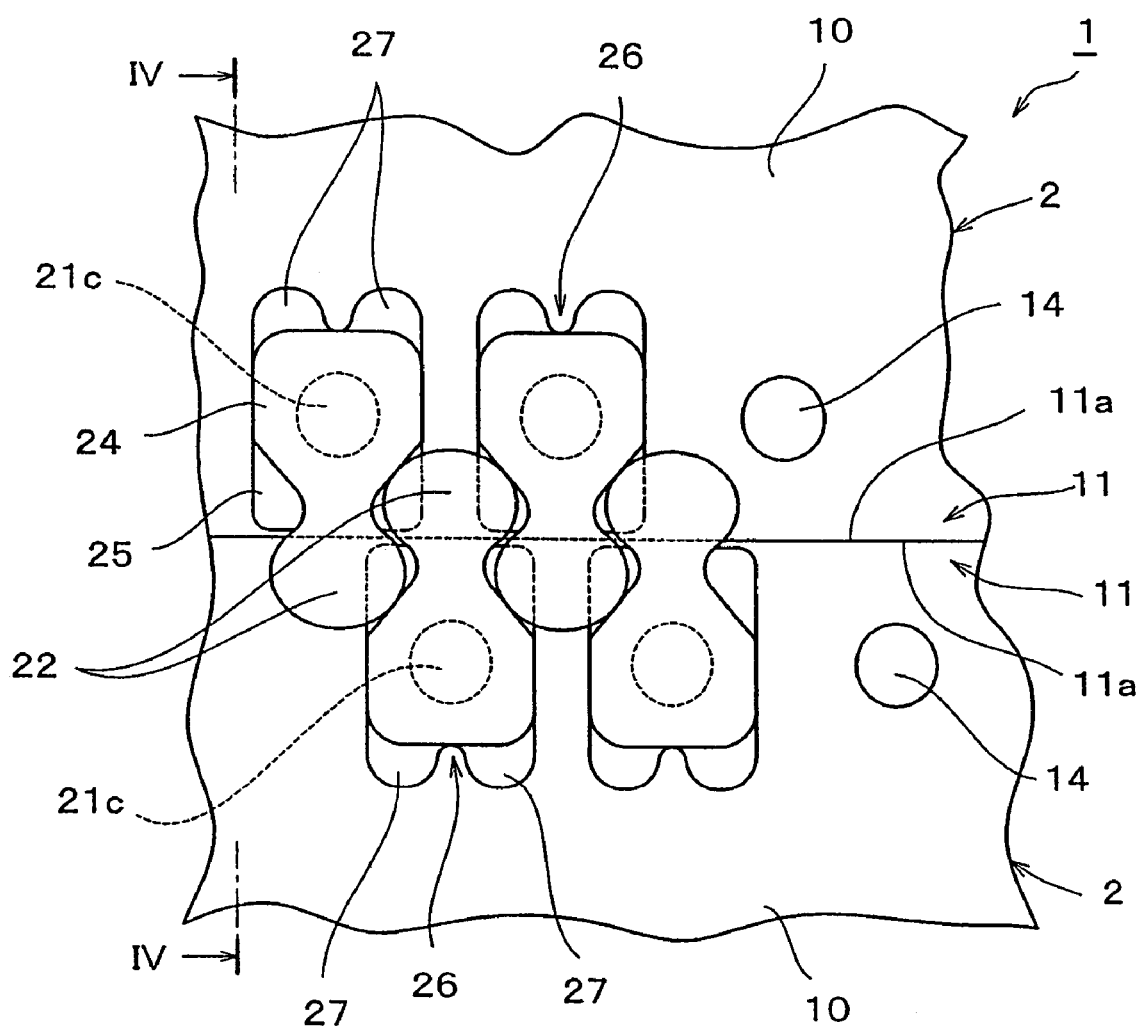
FIG. 1 is a plan view of major portions in which an engagement portion of a slide fastener according to a first embodiment of the present invention is indicated at a center.
Figure 2:
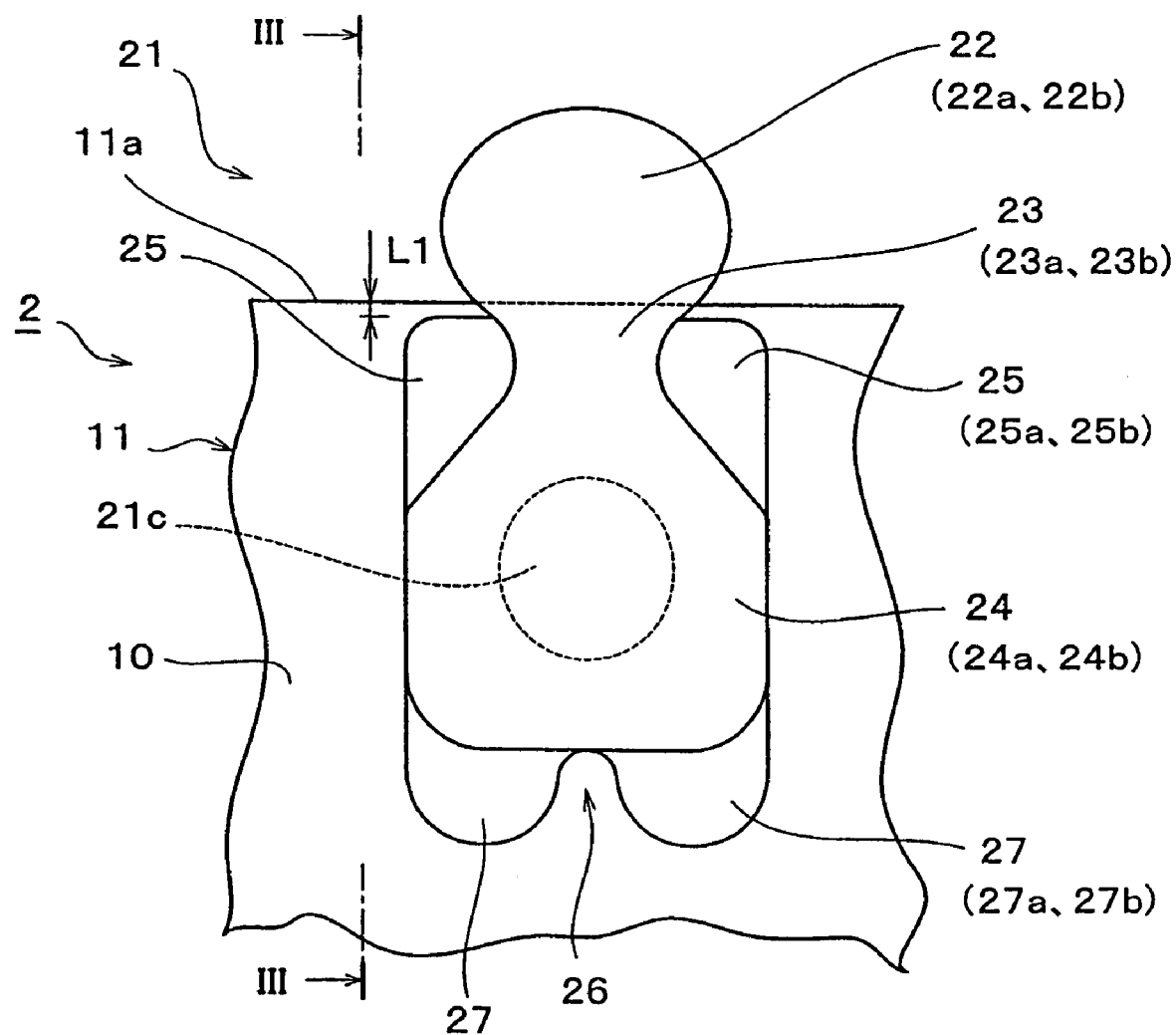
FIG. 2 is a plan view of a fastener element portion in enlargement of a fastener stringer of the slide fastener.
Figure 3:
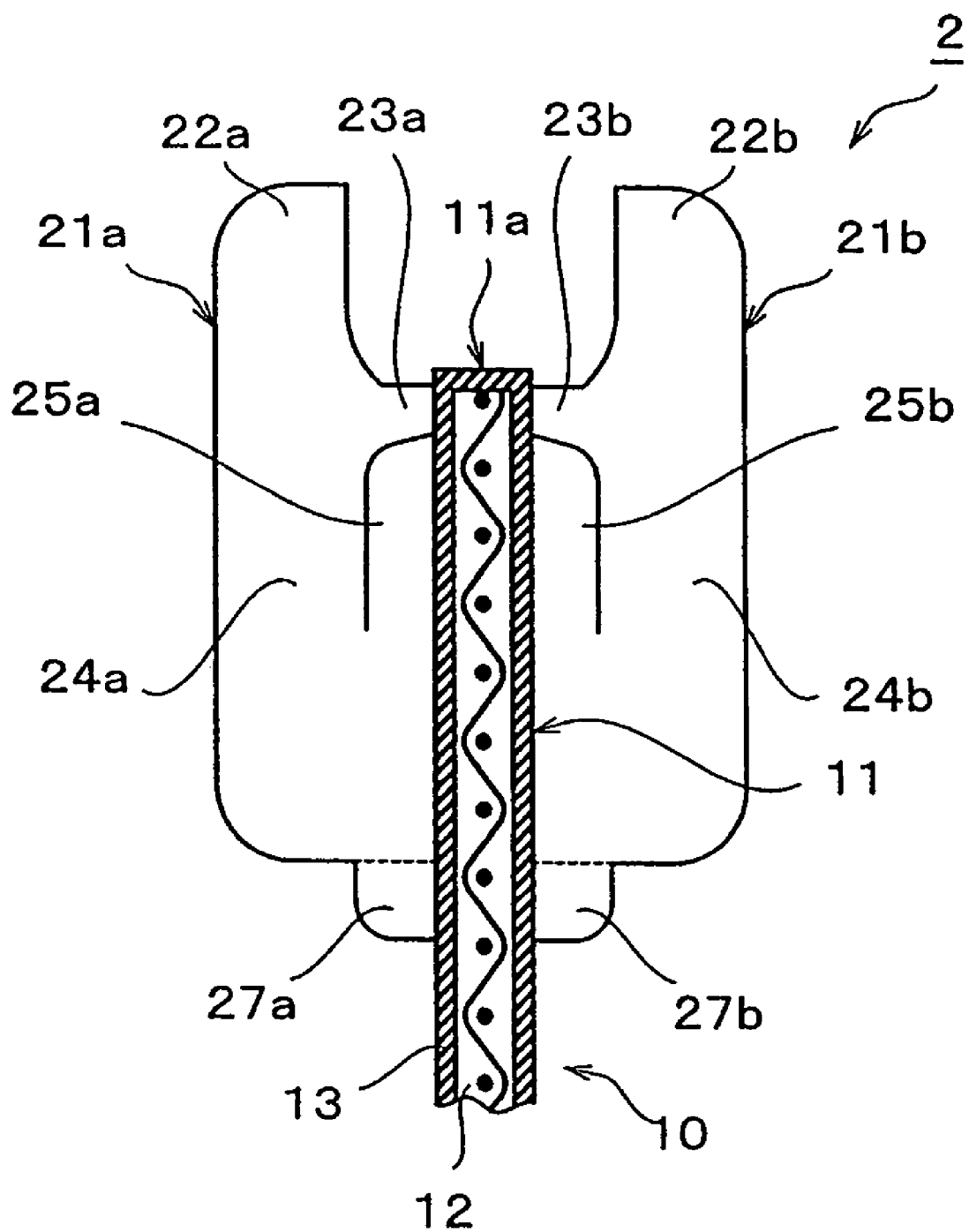
FIG. 3 is a sectional view seen in a direction of arrows along the line III-III shown in FIG. 2.

FIG. 1 is a plan view showing part of a waterproof slide fastener according to a first embodiment of the present invention. FIG. 2 is a plan view of a fastener element having a feature portion of the present invention applied to the same slide fastener. FIG. 3 is a side view of the same element. Although the present invention naturally includes an airtight slide fastener, the waterproof slide fastener is exemplified for this embodiment.

In a slide fastener 1 of this embodiment, a plurality of fastener elements 21 are formed integrally with a coupling interval with respect to each mating fastener element 21 along an element mounting edge portion 11 which is a side edge portion of a waterproof fastener tape 10, so as to form a fastener element row. Further, the slide fastener 1 is provided with synthetic resin made or metallic slider and top and bottom end stops having an ordinary structure, although not shown in the figures.

The waterproof fastener tape 10 is produced by fixing and covering an entire surface of a belt-like core material 12 composed of fiber woven fabric or knit fabric like a conventional type with a natural or synthetic rubber material as described in the International Application Publication No. WO 02/03825 A1 or an elastomer material 13 made of various kinds of synthetic resin. A through hole 14 is formed at a forming portion of each element of the element mounting edge portion 11 of the fastener tape 10, the through hole being large enough for raw material resin in a molten state of each fastener element 21 to pass through.

On the other hand, the aforementioned fastener element 21 comprises a coupling head 22 having an elongated circle which is slightly longer in its right and left directions as seen in plan view, a body portion 24 having a substantially hexagonal shape as seen in plan view which is continued from the coupling head 22 through a neck portion 23, blade-like shoulder portions 25 extended in the right and left directions over the neck portion 23 and the body portion 24, and leg portions 27 extended downward such that two sections thereof are branched from a bottom end of the body portion 24 through a crotch portion 26. Fastener elements 21 having such a structure nip the element mounting edge portion 11 of the fastener tape 10 and are integrated through a connecting portion 27 formed in the through hole 14 and comprise half portions 21a, 21b formed integrally on front and rear faces of the fastener tape 10. According to this embodiment, the shoulder portions 25 may be excluded.

Respective half portions 22a, 22b; 23a, 23b; 24a, 24b; 25a, 25b; 27a, 27b of the coupling head 22, the neck portion 23, the body portion 24, the shoulder portions 25, leg portions 27 are formed integrally on the front and rear faces of the fastener tape 10 such that they are symmetrical across the tape 10. Here, the respective half portions 23a, 23b; 24a, 24b; 25a, 25b; 27a, 27b excluding those of the coupling head 22 are fused with the front and rear faces of the fastener tape 10 integrally.

The half portions 22a, 22b of the coupling head 22 formed symmetrically in a vertical direction across the fastener tape 10 are formed to extend outward in parallel with an interval substantially similar to a thickness of the fastener tape 10 to right and left sides from a terminal end 11a, with the terminal end 11a of the element mounting edge portion 11 of the fastener tape 10 exposed slightly outside as shown in FIG. 3. That is, an interval of substantially three times the thickness of the fastener tape 10 exists between the half portions 22a and 22b of the coupling head 22 across the fastener tape 10. An exposed length L1 of the terminal end 11a of the element mounting edge portion 11 of the fastener tape 10 is set to such a dimension which allows an exposed end face of the terminal end 11a to make a firm contact with an exposed end face of a mating fastener tape 10 when this coupling head engages a mating coupling head 22.

Figure 4:
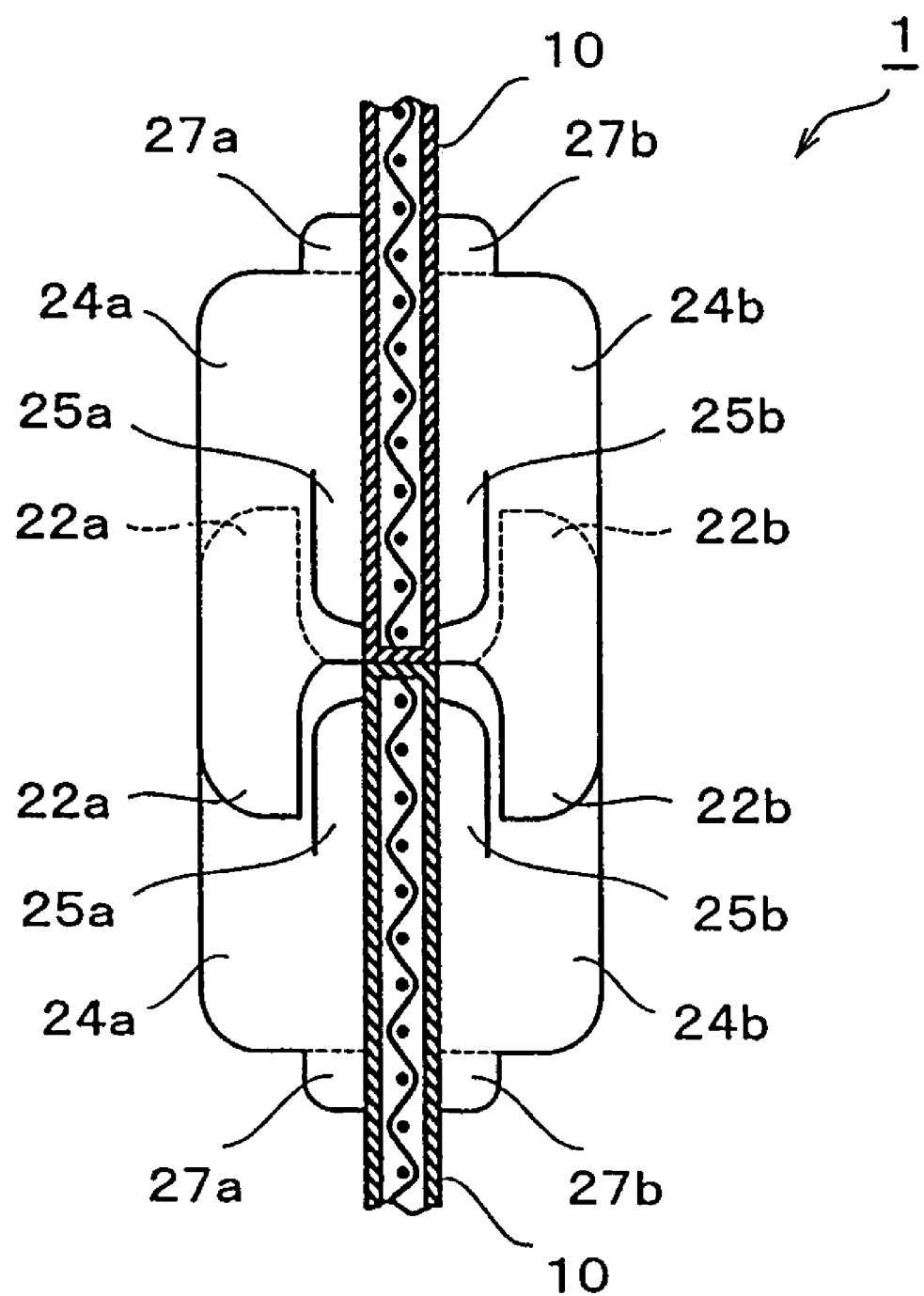
FIG. 4 is a sectional view seen in a direction of arrows along the line IV-IV of FIG. 1.

On the other hand, the respective half portions 23a, 23b; 24a, 24b; 25a, 25b; 27a, 27b of the neck portion 23, the body portion 24, the shoulder portion 25 and the leg portion 27 are fixed firmly on the element mounting edge portion 11 of the fastener tape 10. Among these half portions, a thickness of the each half portion 23a, 23b; 24a, 24b of the neck portion 23 and the body portion 24 is the largest and a thickness of each half portions 25a, 25b; 27a, 27b of the shoulder portions 25 and the leg portions 27 is substantially ⅓ of the thickness of each half portion 23a, 23b; 24a, 24b of the neck portion 23 and the body portion 24, as shown in FIG. 3. Further, an outside surface of the half portions 22a, 22b of the coupling head 22 is on a same plane as an outside surface of the respective half portions 23a, 23b; 24a, 24b of the neck portion 23 and the body portion 24, as also shown in FIG. 3. When the fastener elements 21 engage each other under such a structure, the half portions 25a, 25b of the shoulder portion 25 of each of fastener elements 21 adjacent in right and left make contact with an inside face of the half portions 22a, 22b of the coupling head 22 of one fastener element 21, as shown in FIGS. 1 and 4.

Figure 5:
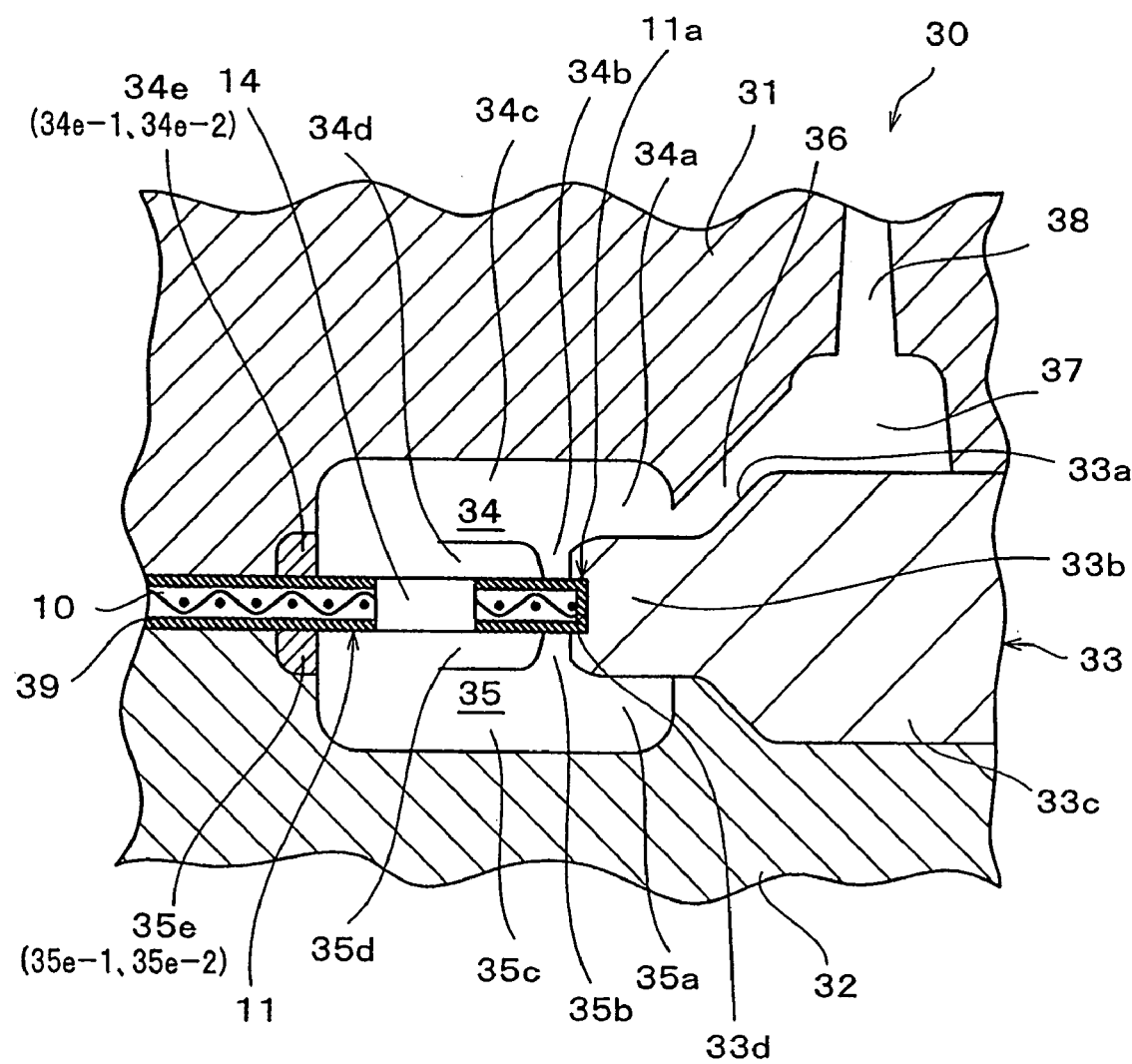
FIG. 5 is a partial sectional view showing a major portion of a manufacturing mold for the fastener stringer.

The slide fastener of this embodiment having the above-described structure can be formed continuously with an interval on the element mounting edge portion 11 of the waterproof fastener tape 10 with a mold assembly such as an injection molding die 30 shown in FIG. 5. The injection molding die 30, as shown in the same figure, comprises a movable mold 31, which is a first mold, a fixed mold 32, which is a second mold fixed on a base (not shown), and a third mold 33 disposed between the movable mold 31 and the fixed mold 32 when these molds are closed. According to this embodiment, the movable mold 31 is disposed above the fixed mold 32, and a first cavity 34 for molding an upper half portion 21a of each fastener element 21 and a second cavity 35 for molding a lower half portion 21b of the fastener element 21 are formed in opposing faces thereof. Further, a runner 37 and a sprue 38, which communicate with the first cavity 34 through a gate 36 are formed in the movable mold 31.

The movable mold 31 descends to the fixed mold 32, and the third mold 33 is disposed in a space formed between the movable mold 31 and the fixed mold 32. This movable mold 31 makes a firm contact with a top face of the fixed mold 32, and a molten resin material is injected to the sprue 38 from an injector (not shown). The injected molten resin material is introduced into the first cavity 34 through the runner 37 and the gate 36 and reaches the second cavity 35 through the through hole 14 in the fastener tape 10. The respective half portions 21a, 21b of the fastener element 21 are formed on both front and rear faces of the element mounting edge portion 11 of the fastener tape 10 through a connecting portion 21c formed in the through hole 14 such that they are fused and integrated together. Although the first and second cavities 34 and 35 are shown in a single unit respectively in FIG. 5, plural pairs of the first and second cavities 34 and 35 are formed in a direction perpendicular to this paper. According to this embodiment, since each of the first cavities 34 communicates with the single runner 37 extended in a direction perpendicular to this paper through each gate 36, plural fastener elements 21 can be formed simultaneously at a single injection along the element mounting edge portion 11 of the fastener tape 10.

The first and second cavities 34 and 35 have symmetrical shapes with respect to the fastener tape 10. Thus, the shape of the first cavity 34 will be mainly described below. Naturally, the shape of the first cavity 34 has an outside shape of the upper half portion 21a of the fastener element 21 as described above. More specifically, as shown in FIG. 5, an upper half portion molding cavity 34a for the coupling head 22, an upper half portion molding cavity 34b for the neck portion 23, an upper half portion molding cavity 34c for the body portion 24, an upper half portion molding cavity 34d for the shoulder portion 25 and an upper half portion molding cavity 34e for the leg portion 27 are formed continuously. Further, when the injection molding die 30 is closed, first and second cavity faces of the movable mold 31 and the fixed mold 32 do not contact each other and a gap for an insertion passage 39 for the fastener tape 10 formed continuously in a direction perpendicular to this paper is provided between both molds 31 and 32. The gap for this insertion passage 39 is set to a dimension sufficient for inserting the fastener tape 10 and sealing it. At this time, the terminal end 11a of the element mounting edge portion 11 of the fastener tape 10 is inserted into a tape nipping groove 33d, which is formed in an end face of the third mold 33 as shown in FIG. 5 and described later, and nipped thereby.

The third mold 33 is composed of a single sheet material having a length equal to a length of the movable mold 31 in a direction perpendicular to this paper, and a sectional shape of its side end portion is comprised of a thin portion 33b and a thick portion 33c via an inclined step portion 33a. The tape nipping groove 33d is formed in an insertion end face of the thin portion 33b such that it extends in the length direction. A width of this tape nipping groove 33d is of a dimension sufficient for holding the element mounting edge portion 11 of the fastener tape 10. A depth of the tape nipping groove 33d is equal to a projection length of the element mounting edge portion 11 of the fastener tape 10 projecting between the half portions 22a and 22b of the coupling head 22 of each fastener element 21. In the meantime, top faces of the inclined step portion 33a, the thin portion 33b and the thick portion 33c of the third mold 33 form a bottom face of each gate 36 and the single runner 37. If the third mold 33 is composed of two sheet materials such as upper and lower ones, instead of being composed of a single sheet material, the terminal end 11a of the fastener tape 10 can be nipped securely, although this embodiment is not shown in figures.

If the tape nipping groove 33d is formed in the end face of the third mold 33 in this way, the terminal end of the fastener tape 10 is nipped by the tape nipping groove 33d formed in the end portion of the third mold 33 when the fastener element 21 is formed. Consequently, when molten resin flows in a single direction from the gate 36 formed in the movable mold 31 to a front face and a rear face of the fastener tape 10 with a high injection pressure through the through hole 14 formed in the element mounting edge portion 11 of the fastener tape 10, no deflection occurs at the element mounting edge portion 11, and the molten resin flows through the through hole 14 and runs around to the rear face smoothly. As a result, uniform half portions of the fastener element 21 are formed stably on both front and rear faces of the fastener tape 10.

Particularly, according to this embodiment, instead of forming the conventional fin piece, first and second half portion molding cavities 34e-1, 34e-2; 35e-1, 35e-2 are formed by dividing the upper and lower half portion molding cavities 34e, 35e of the leg portions 27 so as to separate the two leg portions 27 via the crotch portion 36. Thus, at the time of injection, the front and rear faces of the fastener tape 10 are nipped from above and below by a mold portion existing between right and left separating portions of the first and second half portion molding cavities 34e-1, 34e-2; 35e-1, 35e-2. Therefore, when the molten resin flows in a single direction from the front face of the fastener tape 10 to the rear face through the through hole 14, no deflection occurs in the fastener tape 10. As a result, the molten resin flows uniformly in an extremely stable condition and the respective leg portions 27 are formed on both the front and rear faces of the fastener tape 10 with a sufficient forming pressure, so that a fixing strength of each leg portion 27 is improved considerably.

In the waterproof slide fastener 1 of this embodiment comprising a pair of fastener stringers 2 each on which formed the plurality of fastener elements 21 integrally along the element mounting edge portion 11 of the fastener tape 10, the two leg portions 27, 27, right and left extending via the crotch portion 26 from the body portion 24 of the fastener element 21 work for reducing a sliding resistance against flange portions of a slider (not shown) largely, so that not only a sliding operation of the slider can be made extremely smooth but also the fixing strength of the fastener element 21 to the fastener tape 10 is increased.

According to this embodiment, warp yarns having a higher heat shrinkability than other warp yarns are disposed at the terminal end 11a of the element mounting edge portion 11 of the fastener tape 10, and the element mounting edge portion 11 shrinks larger than other region due to heat at the time of formation. As a result, the element mounting edge portion 11 is dented slightly inward so that it is curved into an arc shape. Consequently, resistance to a lateral pulling force to release an engagement of the fastener elements is increased when opposing fastener elements engage each other, thereby not to release the engagement easily.

Second Embodiment

Figure 6:
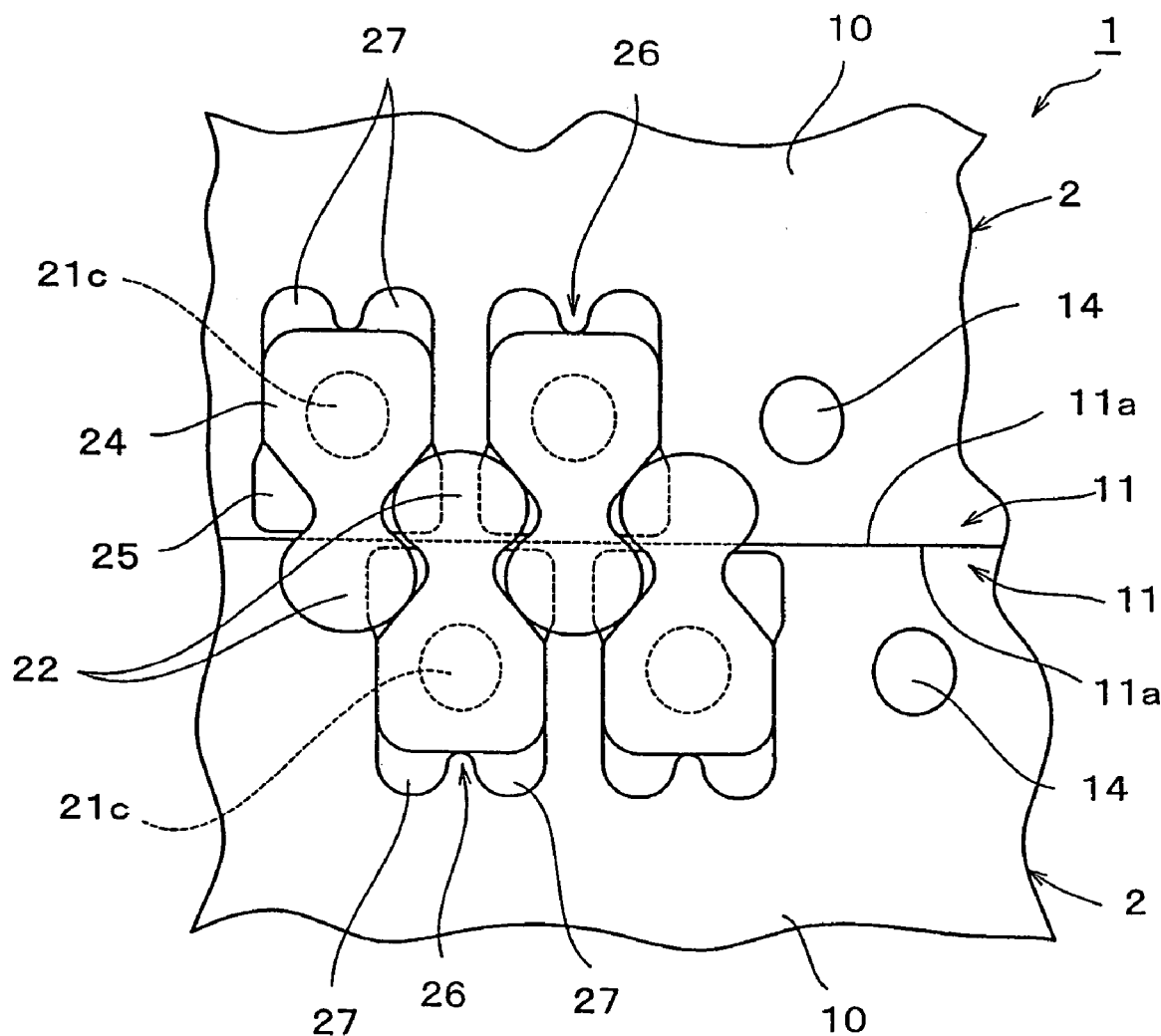
FIG. 6 is a plan view of a major portion in which an element mounting edge portion of a slide fastener according to a second embodiment of the present invention is indicated at a center.
Figure 7:
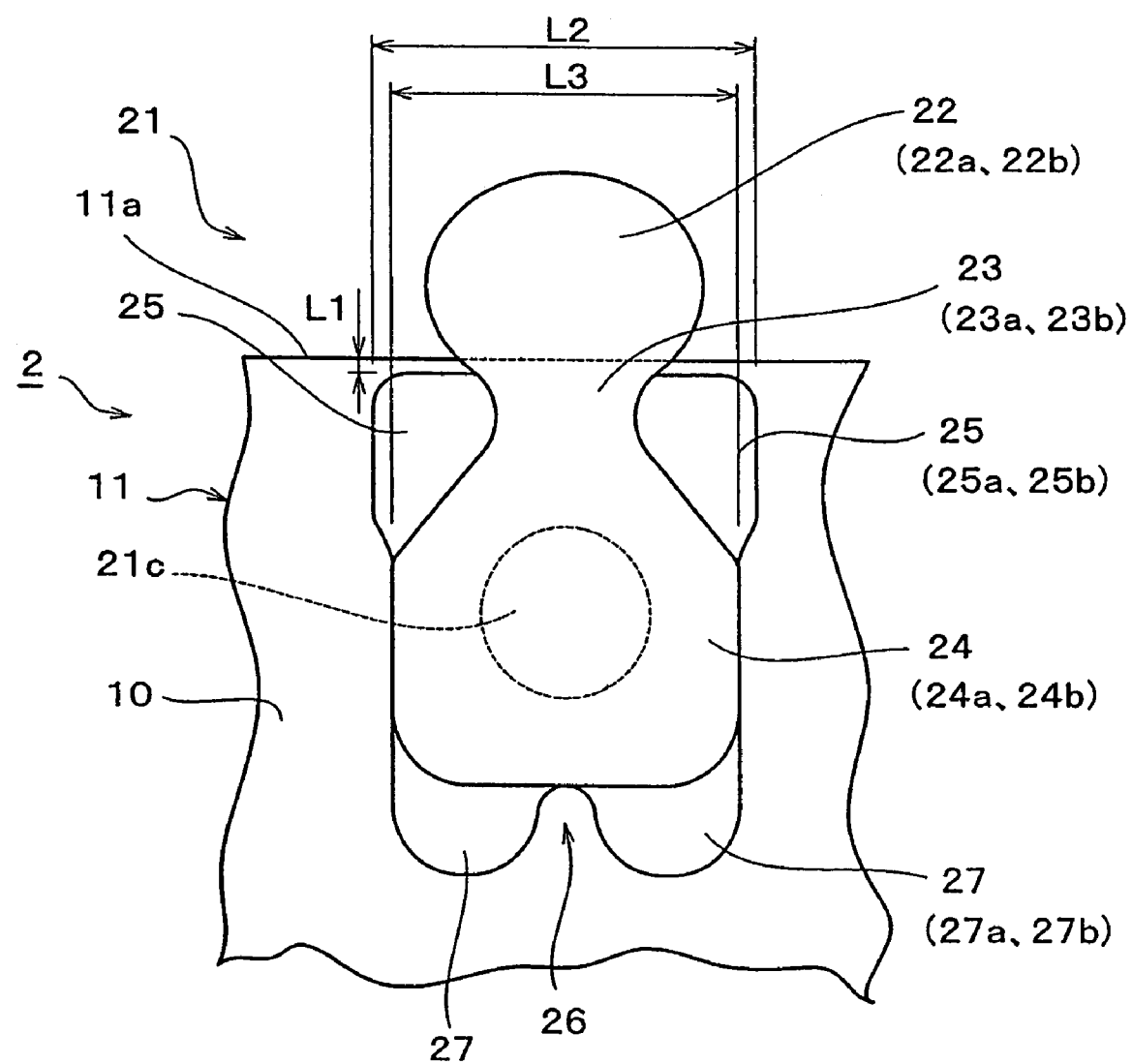
FIG. 7 is a plan view showing a fastener element portion in enlargement of a fastener stringer of the slide fastener.

FIGS. 6 and 7 show a second embodiment of the present invention.

This embodiment is different from the first embodiment only in that an entire shoulder width L2 between right and left ends of the right and left shoulder portions 25 is set larger than a body width L3 of the body portion 24. According to this embodiment, the conventional single fin piece may be used instead of the two leg portions 27, 27. Because the entire shoulder width L2 is set larger than the body width L3, a surface area of the shoulder portion 25 increases, so that a contact area between a surface of the shoulder portion 25 and an inside face of the coupling head 22 increases, thereby intensifying waterproofness.

Figure 8:
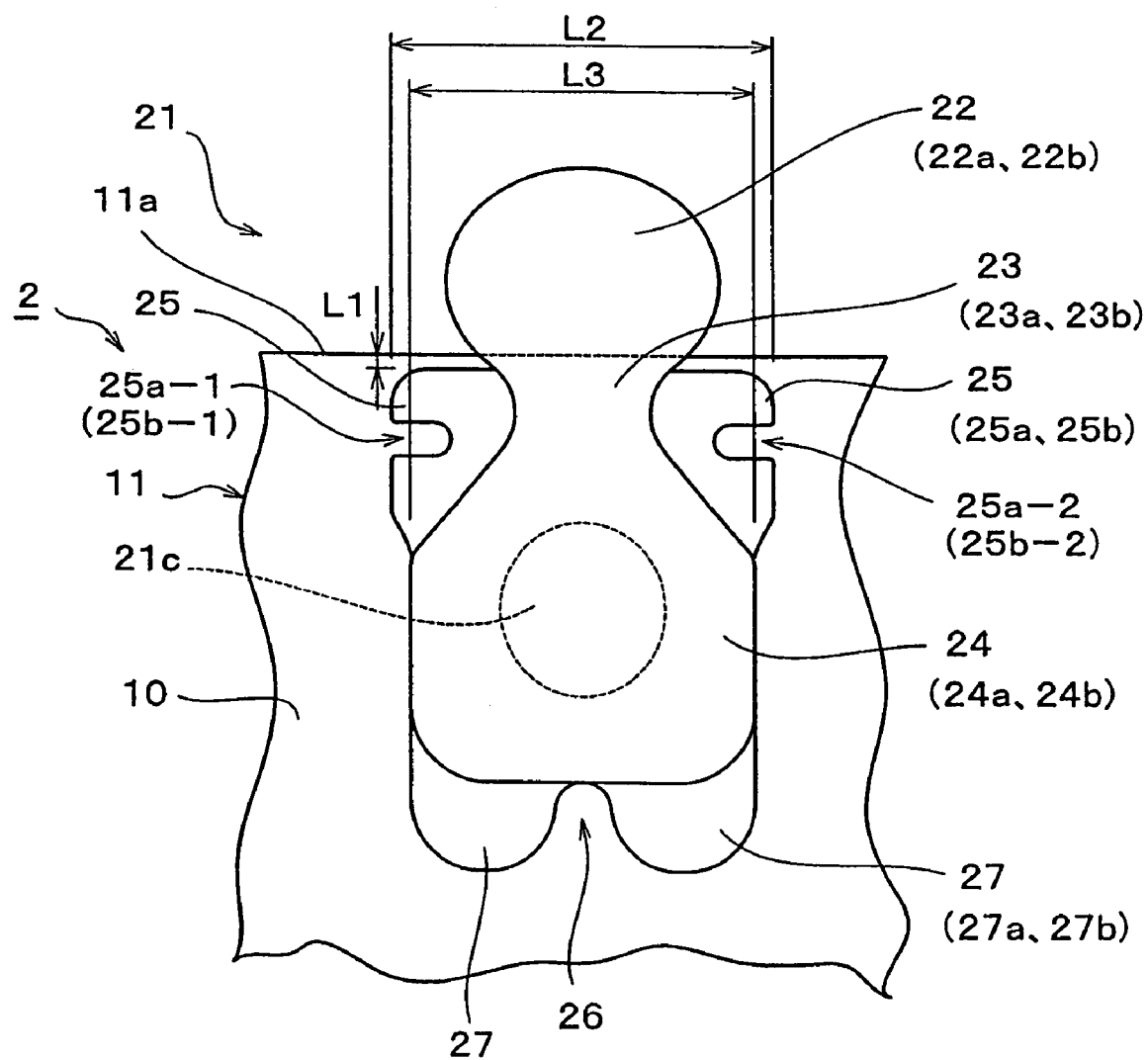
FIG. 8 is a plan view showing a modification of a fastener element according to the second embodiment in enlargement.
Figure 9:
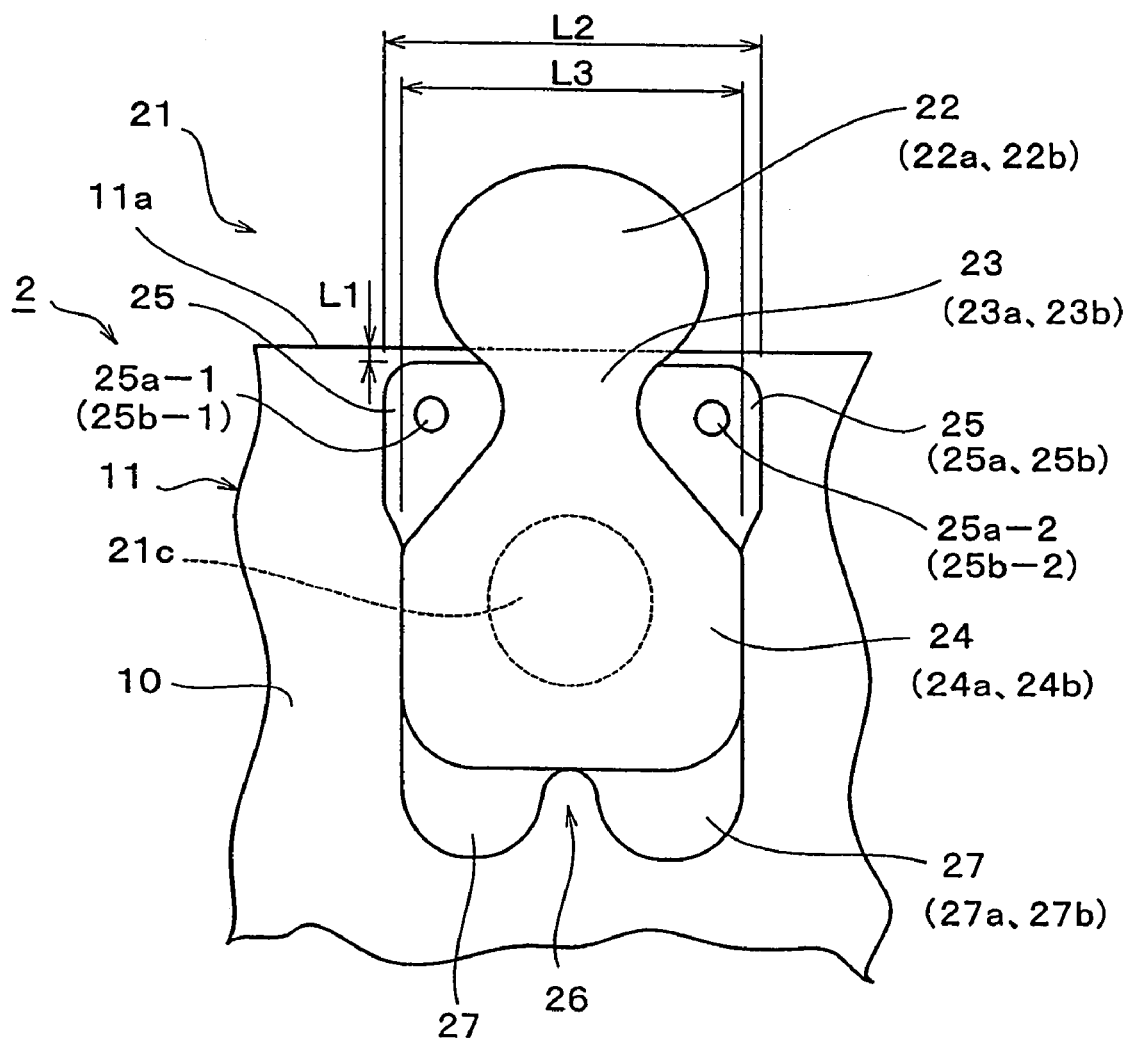
FIG. 9 is a plan view showing another modification in enlargement.

FIGS. 8 and 9 show modifications of the shoulder portion 25. According to these modifications, volumes of the upper and lower half portion molding cavities 34d, 35d of the shoulder portion 25 to be formed in the injection molding die 30 increase by an amount corresponding to an increase in the shoulder width L2. Consequently, nipping forces of the movable mold 31 and the fixed mold 32 with respect to the element mounting edge portion 11 of the fastener tape 10 decreases. Because external forces such as a lateral pulling force is applied most strongly to this element mounting edge portion 11 when the fastener elements 21 engage each other, this portion is required to have a sufficient fixing force. Reducing of the nipping force results in generation of deflection in the element mounting edge portion 11.

Figure 10:
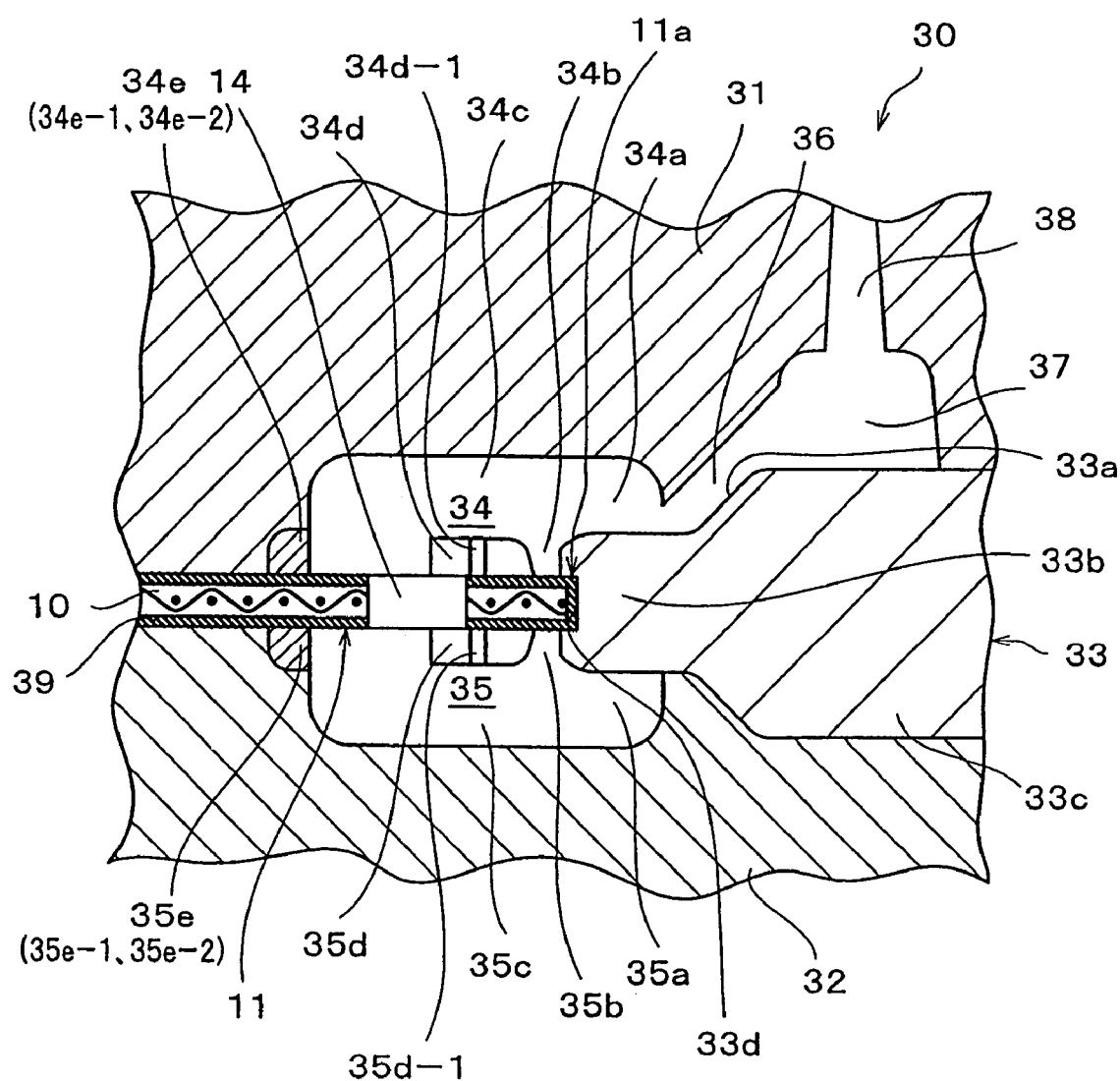
FIG. 10 is a partial sectional view showing a major portion of a manufacturing mold for the modification.
Figure 11:
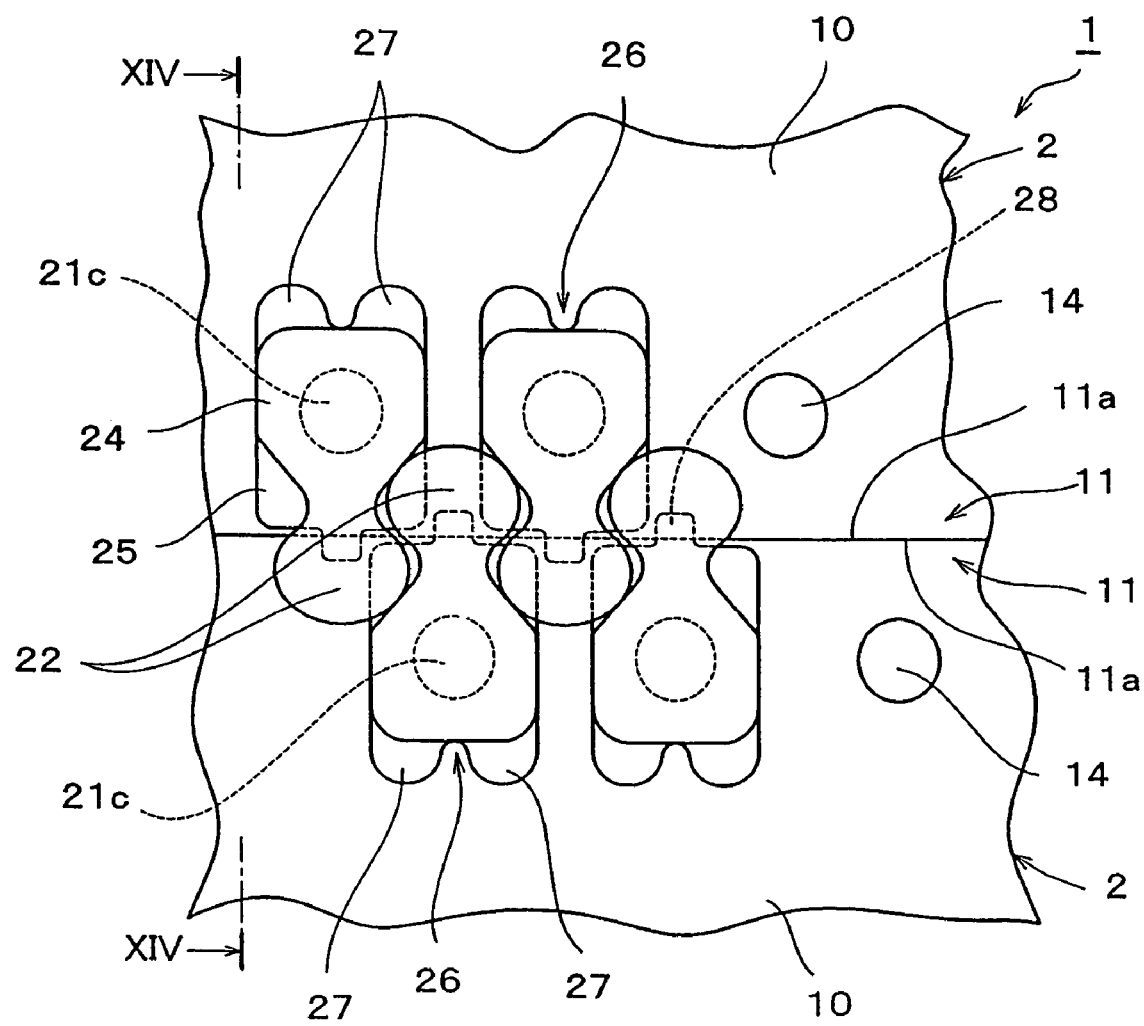
FIG. 11 is a plan view of a major portion in which an engagement portion of a slide fastener according to a third embodiment of the present invention is indicated at a center.
Figure 12:
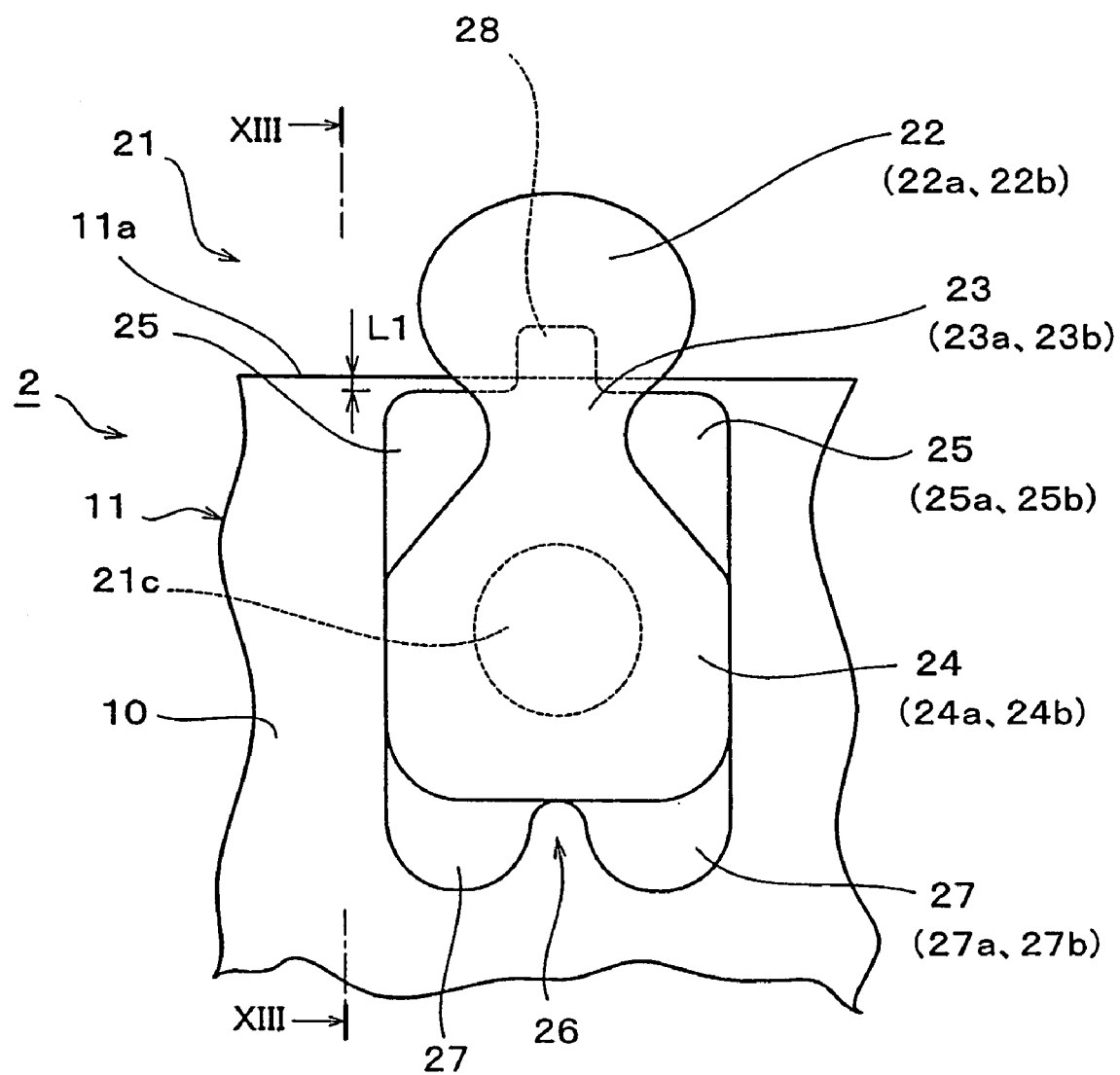
FIG. 12 is a plan view showing a fastener element portion of a fastener stringer of the slide fastener in enlargement.
Figure 13:
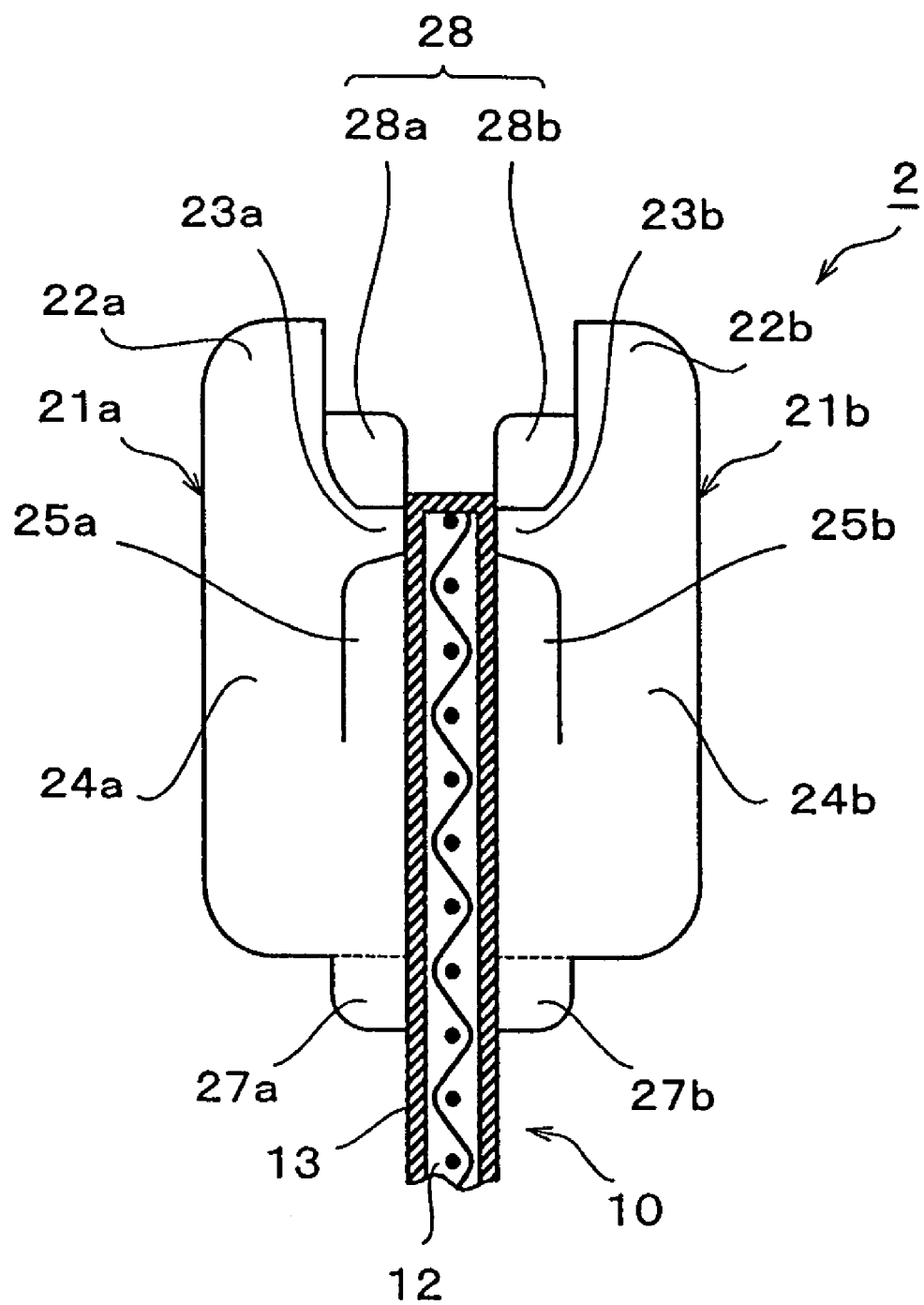
FIG. 13 is a sectional view seen in a direction of arrows along the line XIII-XIII in FIG. 12.
Figure 14:
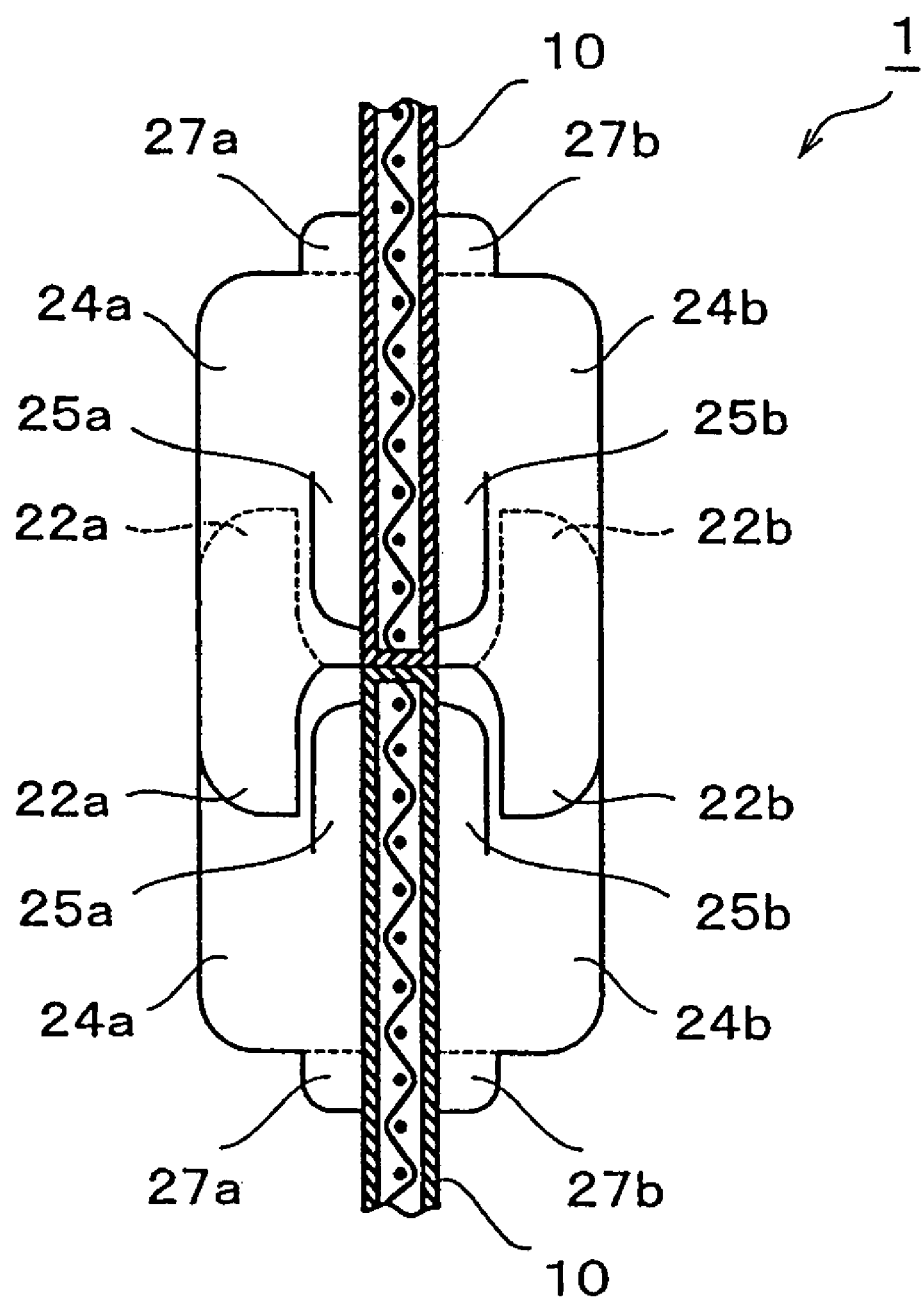
FIG. 14 is a sectional view seen in a direction of arrows along the line XIV-XIV in FIG. 11.

Thus, according to these modifications, blocking portions 34d-1, 35d-1 for blocking a flow of molten resin are formed in part of the upper and lower half portion molding cavities 34d, 35d of the shoulder portion 25. As the blocking portions 34d-1, 35d-1, linear ribs are projected at corresponding portions of the upper and lower half portion molding cavities 34d, 35d so as to form cutout portions 25a-1, 25a-2; 25b-1, 25b-2 of linear shapes by cutting out part of outer side face portions of the blade-like right and left shoulder portions 25, as shown in FIG. 10. Alternatively, cylindrical protrusions are projected in centers of the upper and lower half portion molding cavities 34d, 35d of the right and left shoulder portions 25 so as to form cutout portions 25a-1, 25a-2; 25b-1, 25b-2 of cylindrical shapes. If the blocking portions 34d-1, 35d-1 are formed in part of the upper and lower half portion molding cavities 34d, 35d of the shoulder portion 25, part of the element mounting edge portion 11 of the fastener tape 10 is nipped strongly by the blocking portions 34d-1, 35d-1, so that no deflection occurs in the element mounting edge portion 11 at the time of injection. Therefore, the shoulder portions 27 can be formed on the element mounting edge portion 11 with a high fixing force.

Third Embodiment

FIGS. 11 to 15 show a third embodiment of the present invention. According to this embodiment, a pair of protrusions 28 are provided in a center of each of opposing faces of respective half portions 22a, 22b of the coupling heads 22 extending outward in parallel from the element mounting edge portion 11 of the fastener tape 10 with the gap, the protrusions being started from a coupling head side end of each of the upper and lower half portions 23a, 23b of the neck portion 23 and extending toward a vertex of each of the half portions 22a, 22b of the coupling heads 22 up to halfway thereof. A width of each protrusion 28 is set to such a dimension which allows both the right and left side faces of the protrusion 28 of one coupling head 22 to be located between adjoining shoulder portions 25, 25 of a mating fastener elements when respective fastener elements engage each other. The width, an extension length and a shape of the protrusion 28 are determined under a condition in which they never obstruct opening and closing operations of the pair of fastener stringers 2.

According to this embodiment, a shape of the protrusion 28 is substantially rectangular in its side view and right and left corners of an end portion are formed in round faces. In the meanwhile, the shape of the protrusion 28 is not limited to an indicated example, but may be formed into, for example, a semi-elongated circle or its modification. Because other structures than the above-mentioned points are substantially equal to the corresponding structures of the first embodiment, same reference numerals as those given to FIGS. 1 to 4 are attached and description thereof is omitted.

Figure 15:
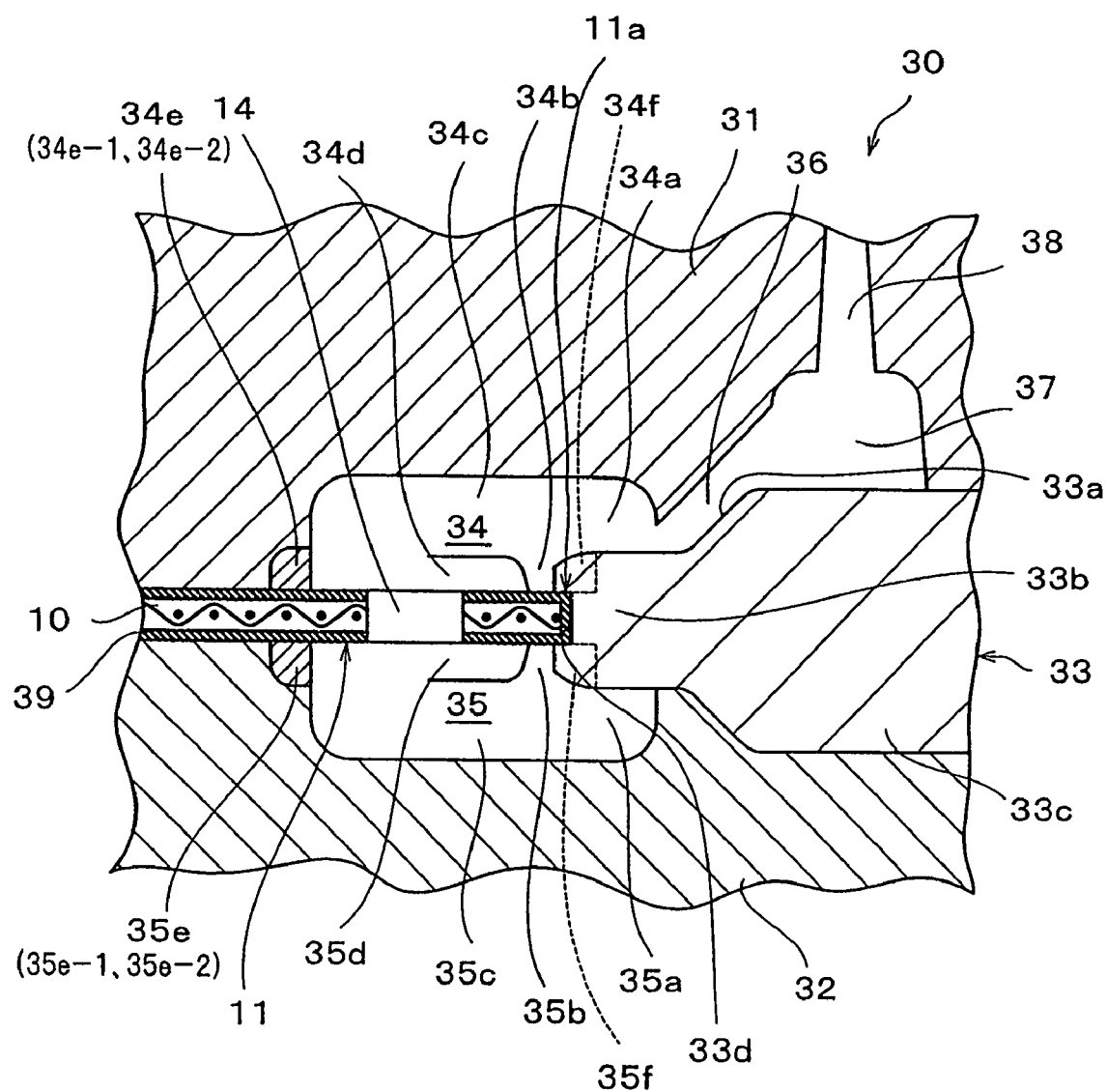
FIG. 15 is a partial sectional view showing a major portion of a manufacturing mold for the fastener stringer.

On the other hand, the injection molding die 30 for molding fastener elements having the above-described structures of the waterproof slide fastener according to the third embodiment is different from the injection molding die 30 in the first embodiment in that half portion molding cavities 34f, 35f for molding upper and lower half portions 28a, 28b of the protrusion 28 to be formed on opposing faces of the coupling head 22 are formed by cutting out part of upper and lower portions of the coupling head 22 to communicate with the upper and lower half portion molding cavities 34a, 35a of the coupling head 22 from a front end of the thin portion 33b of the third mold 33 up to a position corresponding to the extension length of the protrusion 28 as indicated with dotted line in FIG. 15. Other structures are substantially not different from those of the injection molding die 30 in the first embodiment.

If the protrusions 28 are formed on opposing inner faces of the coupling head 22 as mentioned in the second embodiment, when coupling heads 22 of the pair of fastener stringers 2 engage each other, the side faces of the shoulder portions 25 of the fastener elements 2 in an engaging state come into contact with part of side faces of the protrusions 28, thereby intensifying the waterproofness and stability of configuration at the time of the engagement.

What is claimed is:

1. An apparatus for manufacturing a waterproof slide fastener, comprising a first mold which is movable in opening and closing directions of a mold assembly, a second mold which is fixed, and a third mold which is located between the first mold and the second mold, wherein the first and second molds have an insertion passage for a fastener tape having a through hole at a formation position of fastener elements and the first mold has a sprue, a runner, a gate, and the first and second molds have first and second cavities for molding upper and lower half portions of each fastener element along each element mounting edge portion of front and rear faces of the fastener tape, the first and second cavities have half portion molding cavities for a coupling head, a neck portion, a body portion, right and left shoulder portions and leg portions, the third mold is disposed between the half portion molding cavities for the coupling head in the first and second molds and has a gap for nipping a part of a terminal end of the element mounting edge portion of the fastener tape at an end portion thereof, each half portion molding cavity for the right and left shoulder portions and the leg portions has a thinner molding space than that of each half portion molding cavity for the neck portion and the body portion to be molded integrally on the element mounting edge portion of the fastener tape with half portions of the neck portion and the body portion, and each half portion molding cavity for each of the leg portions is composed of two or more cavities formed with a predetermined interval in length direction of the fastener tape.

2. The apparatus for manufacturing a waterproof slide fastener according to claim 1, wherein, in each half portion molding cavity for the shoulder portions, a maximum length between right and left end portions thereof is set larger than a length between right and left end portions of the half portion molding cavity of the body portion.

3. The apparatus for manufacturing a waterproof slide fastener according to claim 2, wherein each half portion molding cavity for the shoulder portions partially has a blocking portion.

4. The apparatus for manufacturing a waterproof slide fastener according to any one of claims 1 and 2, wherein the third mold nips the terminal end of the fastener tape which is exposed when opposing fastener element rows are engaged with each other, and further has a protrusion molding cavity for molding a protrusion located between the shoulder portions adjacent in the length direction of the fastener tape.

* * * * *